Patented June 18, 1935

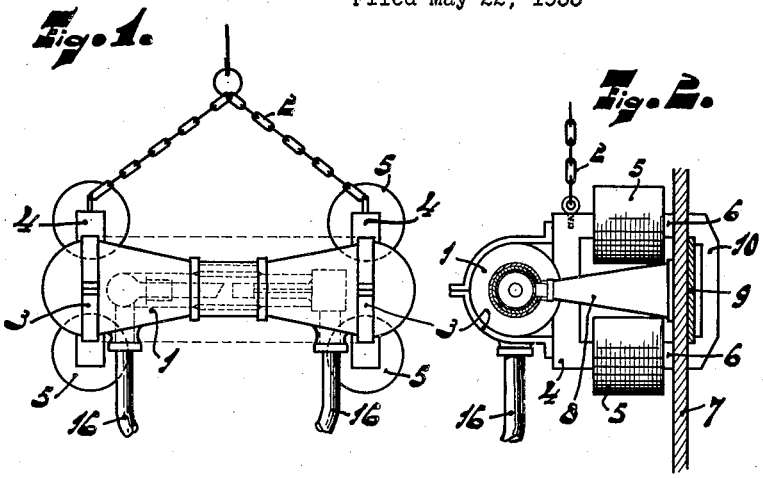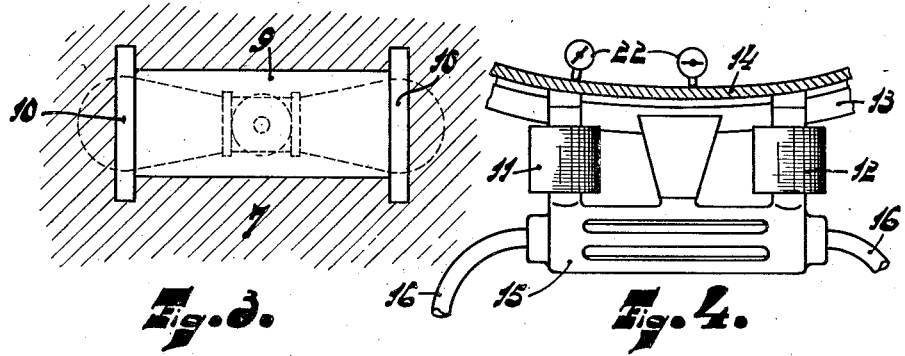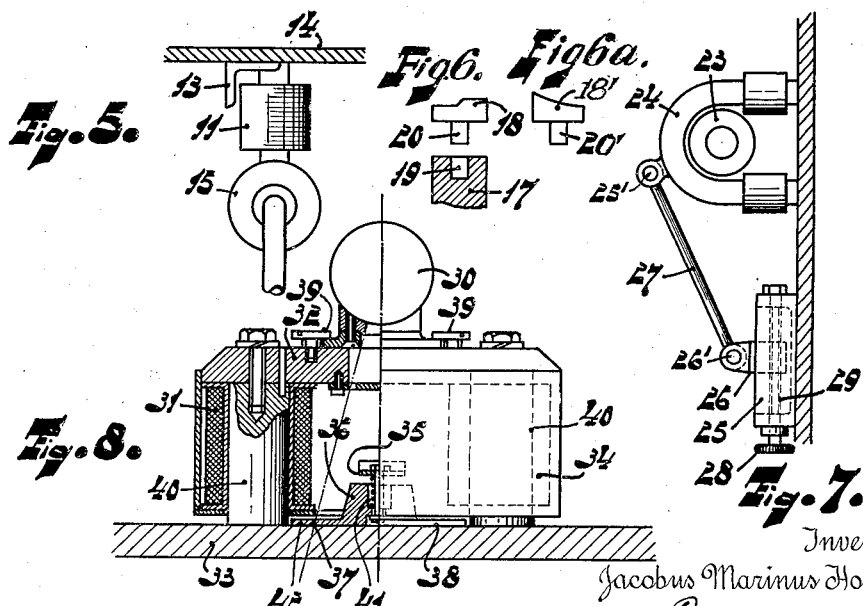

2,005,035

UNITED STATES PATENT OFFICE 2,005,035

X-RAY APPARATUS

Jacobus Marinus Houtman, Eindhoven, Netherlands, assignor, by mesne assignments, to N. V. Philips' Gloeilampenfabrieken, Eindhoven, Netherlands, a Dutch company Application May 22, 1933, Serial No. 672,328
In Germany May 20, 1932

6 Claims. (Cl. 250—34)

The present invention relates to an X-ray or similar ray-emitting apparatus and more particularly to means and methods for sustaining such apparatus by magnetic force in operative relation with a body, for instance, with a metal plate, to be examined.

The examination of materials as to their thickness, flaws and proper welding by means of X-rays or other penetrative radiation, has gained considerable importance in recent years.

For this purpose the object to be examined, for instance a steel plate, is placed between the source of penetrative rays and a suitable ray-receiving means, for instance, a fluoroscopic screen or photographic film or plate, and its thickness, or the character of its welds or the existence of flaws, and thus in general the strength of the object is determined.

For the determination of the thickness of a plate or of other structural members by means of X-rays or other radiant energy, a convenient method has been described in the copending application of Bouwers and Boldingh, Ser. No. 586,224, filed January 12, 1932, in which the distance between the shadow points of two markers is used to determine the thickness of the member.

As a rule, in the past when X-rays were used for such examination, the body to be examined had to be carried to a stationary X-ray apparatus and this not only entailed considerable work, but such examination of many structural parts, as for instance that of the walls of ship bodies or of the welds on steel beams of buildings was altogether unfeasible.

The invention described in the copending application of Bouwers Ser. No. 178,457, filed March 25, 1927, now Patent No. 1,949,005, dated February 27, 1934, provides for a shockproof X-ray tube which can be conveniently rendered portable and brought into operative relation with any such structural body to be examined.

For instance, such a portable X-ray apparatus can be suitably used for the examination of the thickness of ship walls whereby according to the above referred to application of Bouwers and Boldingh, two marks are provided on the wall portion the thickness of which is to be measured, and the X-ray tube is placed at a definite distance from the wall and a fluorescent screen or a photographic plate placed on the other side of the wall, also at a definite distance therefrom, or directly against the wall portion to be examined, and the distance of the shadows of the marks appearing on the screen or plate, used to determine the thickness of the plate.

In many instances, as for instance, when examining the thickness and strength of a ship body or when examining a large number of welds, a large number of examinations or measurements have to be made and in such cases it is of great importance to reduce the time consumed by and between the individual examinations.

In such cases it is among other things, important that the tube be so supported that it can be moved both horizontally and vertically so as to be brought in operative relation with any structural portion to be examined.

For example when examining the wall of a ship body this can be achieved, for instance by suspending the X-ray tube from the top by means of a suitable lifting device.

However, such suspension does not suffice to properly fix the X-ray tube in relation to the parts to be examined, and for instance, vibrations may cause displacement of the tube during the taking of the picture and even small displacements would give inaccurate results.

Even without interfering vibrations it is difficult to maintain the proper distance between the tube and the plate to be examined unless the tube is pressed against the wall by special means.

One object of the present invention is to overcome all of the above difficulties by providing for means and methods which render possible by means of penetrative rays the rapid and accurate examination of the different portions of a structural body.

A further object of the invention is to provide for means whereby an X-ray tube or other source of penetrative rays is suspended in operative relation with the structural body to be examined by means of magnetic force.

A still further object of the invention is to suspend in operative relation with a body to be examined, an X-ray tube or other source of penetrative rays as well as a suitable receiver for such rays by means of the magnetic force obtained from a common magnetic flux.

A still further object of my invention is to retain a source of penetrative rays and a ray-receiver on the opposite sides of a non-magnetic body to be examined, by means of magnetic force.

A still further object of the invention is to provide an X-ray apparatus or other source of penetrative rays which is structurally combined with a permanent or electro-magnet serving to locate said source in operative relation with the body to be examined.

A still further object of the invention is to so combine the source of penetrative rays and the magnet serving to locate the same in operative relation to the body to be examined, that the magnetic field of the magnet does not influence the rays generated in and/or emanating from said source.

A still further object of the invention is to provide an electro-magnet for the suspension of the source of penetrative rays in operative relation with the body to be examined, the core of which has a comparatively high residual magnetism and which creates a sufficiently large magnetic pull to firmly hold the device in its position after the magnet has been pressed to the body by the passage through its coil of a current of small intensity and short duration; and which magnet can be conveniently loosened by sending through the coil a small current of reversed direction.

A still further object of my invention is to provide a magnet for the suspension of the source of penetrative rays, which is provided with interchangeable pole-shoes, the shapes of which conform with the surface of the body to be examined.

A still further object of my invention is an X-ray tube which is provided with a metal envelope which also serves as part of the yoke of the holding magnet.

A still further object of my invention is to provide for methods to accurately determine the position of the ray-receiver with respect to the source of penetrative rays.

A still further object of my invention is to provide for a limited relative movement between the X-ray tube and its holding magnet.

A still further object of my invention is to provide a separate auxiliary magnetic holding body which carries part of the weight of the ray-penetrating source and of its holding magnet.

A still further object of my invention is to provide for a limited relative movement of the X-ray tube and its holding magnet with respect to the auxiliary magnetic holding body.

Further objects of my invention will appear as the specification progresses.

According to the invention the source of penetrative rays, for instance, an X-ray tube, a radium cylinder serving as a source of gamma rays etc. and preferably also the ray-sensitive screen of photographic cassette, hereafter referred to as the ray-receiver, are magnetically held against the body to be examined.

It is well known to utilize the holding power of a magnet and in the U. S. Patent No. 1,712,889 it has already been proposed to use the magnetic force to fix a testing device in operative relation to an object to be examined.

However, in connection with devices the performance of which may be influenced by the strong magnetic field of the holding magnet, magnetic suspension has not been utilized so far and such arrangement would appear altogether unsuitable due to the danger of interference by the magnetic field of the magnet.

Applicant succeeded in utilizing the holding force of a permanent or electro-magnet in connection with a source of penetrative rays, by providing a construction and means in which the magnetic field of the magnet in no way interferes with the rays emerging from the source.

I shall describe my invention in connection with an X-ray tube serving as the source of penetrative rays, although as stated, other suitable sources, for instance radium which emits gamma rays may be used.

According to the invention the X-ray tube is magnetically held against the structural member to be examined. On the other side of said member is disposed and held, preferably also magnetically, the ray-receiver, for instance a fluorescent screen or a cassette provided with a photographic film or plate, the frame of the screen or the cassette being or having attached to it a magnetizable body. Preferably the same magnetic flux fixes both the X-ray tube and the receiver.

To obtain good results the X-ray tube and the receiver have to be pressed against the body to be examined, with great force. This requires high magnetic forces. On the other hand, for convenient and quick handling, it is necessary to easily loosen the magnetically-supported member.

For this reason electro-magnets are more suitable for such purpose than are permanent magnets. However, to create large magnetic forces electro-magnets usually require comparatively high magnetizing currents and when the current is cut off the electromagnet loses practically its entire holding power.

I have found that the most economical and suitable results are obtained if the yoke or core of the electromagnet instead of being, as is usual practice, of soft iron with low residual magnetism, is made of a material which has a comparatively high residual magnetism, for instance of a good magnet steel, such as the well known K. S. magnet (vide Handbook of the American Society for Steel Treating) containing in addition to iron 35% cobalt, 0.6% carbon, 2% chromium and 7% tungsten.

A comparatively small magnetizing current of short duration creates a sufficiently large magnetic pull to firmly press the magnet poles and the ray-receiver against the walls of the object to be examined and this current may be then interrupted, whereby the force due to the residual magnetism of the magnet is sufficient to firmly hold the X-ray tube and the ray-receiver in their proper position.

To loosen the apparatus from the wall of the object after the examination has taken place, a small current of reverse direction is sent through the magnet coils, which partly demagnetizes the magnet yoke so that the holding magnet and ray-receiver can be easily loosened.

The above arrangement has the important advantage that no current is required for holding the apparatus during examination and no special supporting means are required to safeguard the apparatus from dropping should the current be unintentionally interrupted.

The holding magnet for the X-ray apparatus may be of very simple construction. It may comprise one or more individual magnets of which one or more poles are placed directly against the surface of the object to be examined.

The magnet should be capable of producing a strong magnetic field which firmly presses the poles against the object to be examined, and also provides for a sufficient flux to magnetically hold the ray-receiver against the opposite side of the object.

In case the body examined is of ferro-magnetic material, the magnetizable portion of the ray-receiver is magnetized by the stray flux created on the receiver side of the body, respectively by the stray flux of this body which due to the induced magnetism also acts as a magnet.

In case the body to be examined is of non-magnetizable material the magnetizable portion of the ray-receiver completes the magnetic circuit of the holding magnet.

It is not altogether necessary that the holding power of the magnet be sufficient to carry its own weight and that of the X-ray tube, and the strength of the magnet may be limited to the pull required to intimately press it, as well as the ray-receiver against the walls of the body to be examined, and auxiliary suspension means may be provided which fully or partly carry the weight of the apparatus. For instance, the apparatus may be suspended from the top to a chain which in turn is carried by a suitable hoisting device. Instead of, or in addition to such chain suspension an auxiliary holding magnet may be provided, which may be a permanent magnet or an electro-magnet and to which the X-ray tube and its holding magnet are connected, preferably by articulated connecting means.

Preferably provisions are made for a limited freedom of movement of the X-ray tube and its holding magnet, with respect to the auxiliary holding magnet.

It is also advisable to provide a limited freedom of movement of the X-ray tube with respect to its holding magnet so that the X-ray tube can be slightly displaced without requiring its magnet to be loosened.

When using the X-ray tube according to the above referred to Bouwers patent, the metallic envelope of the X-ray tube may be of magnetizable material to form part of the yoke of the magnet.

Preferably all of the parts including the X-ray tube and the connecting cables are surrounded by metallic envelopes which are at ground potential and thus render the whole apparatus shock-proof.

Both the operating current for the X-ray tube and the magnetizing current may be obtained from the regular alternating network in a simple manner, the X-ray tube being connected through a transformer to said source and the direct current for the magnet may be obtained by rectifying the alternating current through a rectifier device, using preferably hot cathode gas-filled rectifier tubes.

As the surfaces of the structural bodies to be examined may have different profiles and as an intimate contact of the magnet poles with these surfaces is imperative, it is preferable to provide the magnet yoke with pole-shoes which have differently shaped end surfaces and which are easily interchangeable.

The exact position of the ray-receiver with respect to the source of penetrative rays can be conveniently determined, by determining on the receiver side the points of maximum magnetic field strength, either by determining the position of maximum magnetic pull or by means of magnetic needles which are preferably directly secured to the ray-receiver.

While, as stated, I have illustrated my invention in connection with an X-ray tube serving as the source of penetrative rays, it can be applied to other sources of penetrative rays and the ray-receiver may not only be a photographic plate or a fluorescent screen but any other type of device, for instance, an ionization chamber, which is adapted to detect or record the rays penetrating through the examined body.

My novel apparatus and methods have a wide field of application in the examination of structural members to determine their thickness, the existence of flaws, the quality of welds, etc. They are excellently suitable for the examination of extended structures as ship bodies, bridges or buildings, etc., and irrespective of whether or not the structural member to be examined is of magnetizable or non-magnetizable material.

The invention will be more clearly understood by reference to the accompanying drawing, which represents diagrammatically by way of example, devices for carrying out the new methods and forms of construction of the apparatus according to the invention.

Figure 1 is a front view of an X-ray tube provided with magnetic holding means showing the apparatus held in operative position for the examination of a plate.

Fig. 2 is a side view partly in section of the apparatus of Fig. 1 also showing the ray-receiver positioned on the other side of the plate.

Fig. 3 is a view of the apparatus of Figs. 1 and 2, as seen from the side of the ray-receiver.

Fig. 4 is a front view of a modified construction of my invention, in which a metal envelope surrounding the X-ray tube forms part of the magnet-yoke.

Fig. 5 is an end view of Fig. 4.

Fig. 6 is a detail of the yoke end and of one shape of interchangeable pole shoe.

Fig. 6a shows another shape of pole shoe.

Fig. 7 is a side view of another modification of my invention in which an auxiliary magnetic carrier is provided to carry part of the weight of the X-ray tube and its supporting magnet, and in regard to which the tube can be displaced to a limited extent.

Fig. 8 is an end view, partly in cross-section, of an apparatus according to my invention, for measuring the thickness of a plate.

Referring to Figs. 1 to 3, the X-ray tube 1 is preferably constructed along the general principles set forth in the above-referred to Bouwers patent, and is surrounded by a metal envelope and provided close to its two ends with two carriers, each carrier consisting of a clasp 3 which surrounds the tube and which is attached to a U-shaped yoke 4.

The upper leg of each yoke 4 is secured to the ends of a chain 2 which is carried by suitable hoisting means.

Each leg of the yoke 4 is surrounded by a coil 5 and terminates in suitable pole-shoes 6, which are brought into contact with the object to be examined, for instance, with a steel plate 7 forming part of the wall of a ship body.

The X-ray tube is provided with a ray-emitting window from which extends a conical applicator 8. When an electric current is passed through the magnet coils the pole-shoes are tightly pressed against the plate and firmly adhere thereto, thus fixing the X-ray tube with respect to the wall.

A suitable ray-receiver 9, for instance, a fluorescent screen or a cassette containing a film or plate, is disposed on the other side of the wall 7 and is provided at its two ends with U-shaped bars 10, which are traversed by the stray field of the magnet extending to the other side of the wall. Instead of providing separate yokes 10, the photographic cassette or the frame of the screen may form the magnetizable yoke.

It should be noted that my apparatus can also be used for the examination of bodies which are of non-magnetizable material, in which case the magnetic circuit of the electromagnet is completed through the yoke 10 and the mutual attraction of the poles 6 and yoke 10 firmly fixes the X-ray tube and the ray-receiver in the proper position.

The electric current for the X-ray tube is supplied through suitable flexible cables 16, which may be surrounded by a flexible metal tubing, which mechanically protects the cable and which is preferably electrically connected to the metal envelope of the tube and is grounded. This renders the whole apparatus shockproof.

The cables 16 lead from the tube to the source supplying the electric energy for the X-ray tube, for instance, to the secondary winding of a transformer, the primary winding of which is connected to the regular alternating current network. The cables 16, are preferably of sufficient length to permit the examination with the X-ray tube of the various portions of a body of extended surface without requiring the transformer to be moved.

The magnetizing current for the coils 5 is supplied from a suitable D. C. source through flexible wires (not shown). This current source may be a rectified current obtained from the alternating network through a proper rectifier device, for instance, gas-filled hot-cathode rectifier tubes.

The yoke 4 is preferably of a material which has comparatively high residual magnetism. In using such a yoke material, a comparatively small magnetizing current suffices and this current needs only to be applied for a short time, to firmly position the magnet. Once the magnet has been thus pressed against the object to be examined, the magnetizing current may be interrupted, as the residual magnetism of the yoke is sufficient to firmly retain the magnet with the X-ray tube as well as the ray-receiver in their proper position. When using such a magnet special suspension means as a chain may altogether be dispensed with, as there is no danger of the device dropping when the magnetizing current is unintentionally interrupted.

To precisely position the ray-receiver with respect to the X-ray tube, especially in cases, for instance, in the examination of an extended surface, when the mutual position of the tube and receiver cannot be precisely ascertained by direct observation, one of the two following methods may be used:

The X-ray tube with its magnet having been brought into the desired position with regard to the object to be examined, the ray-receiver is held against the opposite side of the object so as to approximately oppose the X-ray tube, respectively, the magnet. The ray-receiver is thereupon shifted about, until the position is found in which it is most strongly attracted by the magnet and which is the proper position of the ray-receiver. This position of maximum magnetic pull is quite pronounced and can be easily determined, especially if the end poles of the yoke of the ray-receiver are so designed as to form a direct continuation of the poles 6 of the yoke 4.

Another method of ascertaining the exact location for the ray-receiver, is by means of one or more small magnetic needles or compasses which are preferably mounted on the ray-receiver. Such a compass needle 22, as shown in Fig. 4 points perpendicularly to the wall to be examined when it is in exact opposition with one of the pole pieces 6 of the yoke 4, whereas halfway between the pole pieces it assumes a position parallel to the wall, and in intermediate position assumes intermediate angular positions. Preferably the compass or compasses are secured to the yoke or clamping pieces 10 of the ray-receiver.

Instead of magnetic needles, iron filings may be used in a similar manner; however, such filings have the drawback that they adhere to the wall and are also otherwise inconvenient to handle.

After the magnet and ray-receiver have been properly positioned, the operating current is passed through the X-ray tube and the X-rays emerging through the window and confined by the applicator 8, pass the wall 7, and impinge on the ray-receiver 9.

To loosen the magnet a small current of reverse direction is sent through the coils 5, which partly demagnetizes the yoke and permits the easy loosening of the magnet and of the ray-receiver, and these can now be conveniently brought into operative position for the examination of another portion of the body.

As the cathode rays produced in the discharge space of the X-ray tubes, which in their turn produce the X-rays, are subject to be influenced by a magnetic field, and as the holding magnet produces a strong magnetic field, care has to be taken to prevent the magnetic flux of the magnet from interfering with the direction of the cathode ray beam.

Preferably the relative arrangement of the magnet and the X-ray tube should be such, that the cathode ray beam, or in other words the discharge path of the X-ray tube, should fall within a space which is not traversed by the magnetic field, or if such arrangement is not altogether feasible, provision should be made that the magnetic lines which pass through the tube have the same general direction as the cathode ray beam or are directly opposite thereto. By such arrangement the electrons of the cathode beam remain substantially unaffected by the field of the magnet.

In order to permit a limited displacement of the X-ray tube without requiring the removal of the whole device, the X-ray tube may be arranged with regard to the magnet in such a manner that it can be slightly moved with respect to one or both magnet poles.

Figs. 4 and 5 show a different embodiment of my invention in which a single magnet is provided instead of the two magnets of the construction of Figs. 1 to 3. Each leg of the magnet-yoke carries a coil 11 and 12, the two legs being interconnected by a metal envelope 15 of magnetizable material surrounding the X-ray tube proper, which envelope thus may have both the functions of shockproofing and mechanically protecting the tube, and also of forming part of the magnet-yoke.

In this case the magnetic lines in the yoke 15 have the same direction as the cathode rays or a direction opposite thereto. If desired the cathode beam can be further screened from stray rays by providing an inner screen of magnetizable material.

In Fig. 4 the apparatus is shown as used for the examination of welds between a curved profiled iron bar 13 and a curve plate 14. To provide intimate contact between the magnet poles and the body to be examined, the shape of the pole pieces has to closely conform to the surface of the body. For this purpose it is preferably to provide interchangeable pole shoes having differently shaped end-faces such as 18 or 18', shown in Figs. 6 and 6a. This can be accomplished by providing the ends of the yoke legs 17 with a cylindrical recess 19, into which snugly fits the stud 20 or 20' of differently shaped pole-shoes 18 or 18'.

It is not necessary that the magnet connected with the X-ray tube provide for sufficient pull to carry its own weight and also the weight of the X-ray tube, and as shown in Fig. 7, an auxiliary supporting body 25 may be provided, which may be a permanent magnet or an electromagnet and which carries part of the weight of the apparatus.

The body 25 is connected with the yoke 24 of tube 23 by means of an articulated bar 27. To permit some freedom of movement of the X-ray tube relative to the body 25, the end joint 26' of the bar 27 is connected to a slide 26, which can be displaced in a vertical direction with regard to the body 25. Such displacement can be obtained for instance, by the aid of a screw-spindle 29 operated by a hand-wheel 28. To also provide for the X-ray tube similarly freedom of movement in the horizontal direction the joint 25' may be formed as a ball and socket joint.

In Fig. 8 an arrangement according to my invention is shown for the measuring of the thickness of a body, for instance, that of a steel plate 33, by utilizing the method described in the above-referred to Bouwers and Boldingh application.

An X-ray tube 30 is demountably connected to a magnetizable yoke 32, for instance, by means of screws 39—39, which secure an extension of the metal envelope of the tube to the yoke.

Suitably connected to the yoke 32, for instance, by means of screws, are two cylindrical pole pieces 40, each being surrounded by a coil 31. The coils 31 are surrounded by a housing 34 of non-magnetizable material, for instance of copper, to which is secured a cross-bar 35. Elastically connected with the crossbar 35, for instance, by the interposition of a coil-spring 41, is a block 36 of non-magnetizable material, for example of copper, having an end-plate 42 which is flush with the end-faces of the poles 40, and which carries two markers 37 and 38. The markers 37 and 38 may be, for instance, tungsten wires which are not translucent to the X-rays.

Those rays of the X-ray tube which are intercepted by the markers, (one ray being indicated by the dot and dash line) form shadow pictures on a suitable screen disposed on the other side of the plate 33 (not shown), and the distance between the shadow pictures of the markers 37 and 38 determines the thickness of the plate 33 in a manner fully described in the above-referred to application of Bouwers and Boldingh.

While I have described my invention in connection with specific embodiments and applications, I do not wish to be limited to such embodiments and applications, but desire the appended claims to be construed as broadly as permissible in view of the prior art.

What I claim is:

1. A device for examining a body by means of penetrative rays, comprising a source of penetrative rays and a magnet associated with said source, a receiver for said rays and a magnetizable member for said receiver, said magnet being adapted to hold said source in fixed relation with said body on one side thereof and to hold said ray-receiver on the opposite side of said body.

2. A device for examining a non-magnetizable body by means of penetrative rays, comprising a source of penetrative rays, a magnet associated with said source and a ray-receiver having a magnetizable member, said magnet being adapted to be positioned on one side of said body and having an open magnetic circuit, said ray-receiver when positioned on the other side of said body in proper relation to said magnet, completing through said member said magnetic circuit, the magnetic force exerted between said magnet and said member retaining said magnet, said source and said receiver in operative relation with regard to said body.

3. A device for examining a body by means of penetrative rays, comprising a source of penetrative rays positioned on one side of said body, a ferro-magnetic member connected to said source, a ray-receiver adapted to be positioned on the other side of said body and to oppose said source, and a ferro-magnetic member connected to said ray-receiver, a magnet coil to magnetize one of said ferro-magnetic members and to thereby create a magnetic force, said source and receiver being fixed against said body by means of said magnetic force.

4. A device for examining a body by means of penetrative rays, comprising two devices, one a source of penetrative rays and the other a ray receiver, a holding magnet associated with one of said devices, and a magnetizable member associated with the other of said devices whereby said source and receiver may be held by magnetic force in fixed relation on opposite sides of said body, said magnet comprising a yoke of a magnetizable material having high residual magnetism and a magnetizing coil, said magnet upon passage of a small current of short duration through said coil being adapted to firmly adhere against the body and to remain suspended to it by the residual magnetism of its yoke.

5. A device for examining a body by means of penetrative rays, comprising a source of penetrative rays and a magnet associated with said source, a receiver for said rays and a magnetizable member for said receiver, said magnet comprising a magnetizable yoke, said yoke being of a material having high residual magnetism, a magnetizing coil on said yoke and means to energize said coil, said yoke and said member being held by residual magnetism after said energizing means is disconnected, whereby said source can be held in fixed relation with said body on one side thereof and said receiver can be held on the opposite side of said body.

6. A device for examining a body by means of penetrative rays, comprising a part including a source of penetrative rays adapted to be positioned on one side of said body, and a second part including a ray-receiver adapted to be positioned on the other side of said body and to oppose said source, one of said parts including a magnet and the other part including a magnetizable member, said magnet and magnetizable member being adapted to hold said source and said receiver in fixed relation on opposite sides of said body.

JACOBUS MARINUS HOUTMAN.